United States Patent
Chen et al.

(10) Patent No.: US 9,996,376 B2
(45) Date of Patent: Jun. 12, 2018

(54) VIRTUAL MACHINE MONITORING METHOD AND SYSTEM THEREOF

(71) Applicant: Wistron Corporation, New Taipei (TW)

(72) Inventors: Chih-Ming Chen, New Taipei (TW); Horng-Song Wu, New Taipei (TW)

(73) Assignee: Wistron Corporation, New Taipei (TW)

(*) Notice: Subject to any disclaimer, the term of this patent is extended or adjusted under 35 U.S.C. 154(b) by 87 days.

(21) Appl. No.: 14/608,209

(22) Filed: Jan. 29, 2015

(65) Prior Publication Data
US 2016/0110213 A1   Apr. 21, 2016

(30) Foreign Application Priority Data
Oct. 20, 2014  (TW) .............................. 103136142 A

(51) Int. Cl.
  *G06F 21/00*  (2013.01)
  *G06F 9/455*  (2018.01)
  *H04L 29/06*  (2006.01)

(52) U.S. Cl.
  CPC .......... *G06F 9/45558* (2013.01); *H04L 63/20* (2013.01); *G06F 2009/45562* (2013.01);
  (Continued)

(58) Field of Classification Search
  CPC ... H04L 63/20; H04L 63/205; G06F 9/45558; G06F 2009/45591; G06F 2009/45562; G06F 2009/45575; G06F 2009/45587
  See application file for complete search history.

(56) References Cited

U.S. PATENT DOCUMENTS

| | | | |
|---|---|---|---|
| 7,653,794 B2 | 1/2010 | Michael et al. | |
| 2008/0271033 A1* | 10/2008 | Kamura | G06F 9/5077 718/104 |

(Continued)

FOREIGN PATENT DOCUMENTS

| | | |
|---|---|---|
| TW | 201229909 | 7/2012 |
| TW | 201415371 | 4/2014 |

OTHER PUBLICATIONS

"Office Action of Taiwan Counterpart Application", dated Nov. 24, 2015, p. 1-p. 18, with partial English translation thereof, in which the listed foreign references were cited.

*Primary Examiner* — Joseph P Hirl
*Assistant Examiner* — Chi Nguy
(74) *Attorney, Agent, or Firm* — JCIPRNET

(57) ABSTRACT

A virtual machine monitoring method and a system thereof are provided. The virtual machine monitoring method includes: detecting at least one hardware resource of an electronic device and storing corresponding hardware configuration data, detecting display information of the electronic device and storing corresponding display configuration data, connecting a server and receiving image data therefrom, establishing a virtual machine based on the image data, configuring the at least one hardware resource on the virtual machine based on the hardware configuration data, setting a display image on the virtual machine based on the display configuration data, and clearing the image data to end the virtual machine, so as to provide a user-friendly interface and achieve corporate data security.

12 Claims, 4 Drawing Sheets

(52) U.S. Cl.
CPC .............. *G06F 2009/45587* (2013.01); *G06F 2009/45591* (2013.01)

(56) References Cited

U.S. PATENT DOCUMENTS

| | | | |
|---|---|---|---|
| 2009/0036111 A1* | 2/2009 | Danford | H04L 41/0893 455/419 |
| 2009/0276774 A1* | 11/2009 | Kinoshita | G06F 21/6218 718/1 |
| 2010/0293504 A1* | 11/2010 | Hachiya | G06F 9/4443 715/806 |
| 2010/0306771 A1* | 12/2010 | Kamay | G06F 9/45558 718/1 |
| 2013/0117359 A1* | 5/2013 | Husain | G06F 9/445 709/203 |
| 2013/0167148 A1* | 6/2013 | Lee | G06F 9/45558 718/1 |
| 2014/0156778 A1* | 6/2014 | Luxenberg | H04L 67/2842 709/213 |
| 2015/0268740 A1* | 9/2015 | Herbert | G06F 3/038 345/157 |

\* cited by examiner

VIRTUAL MACHINE MONITORING METHOD AND SYSTEM THEREOF

CROSS-REFERENCE TO RELATED APPLICATION

This application claims the priority benefit of Taiwan application serial no. 103136142, filed on Oct. 20, 2014. The entirety of the above-mentioned patent application is hereby incorporated by reference herein and made a part of this specification.

BACKGROUND OF THE INVENTION

Field of the Invention

The invention relates to virtualization technology and particularly relates to a virtual machine monitoring method and a system thereof.

Description of Related Art

Due to the development of infrastructure, mobile office, which is not limited by location or time, is drawing a lot of attention. In the past, it was common for companies to purchase and use additional mobile devices as support of mobile office. The mobile device may have software installed therein, which can be coordinated with the system of the company, such that the mobile device can be connected with the internal network of the company for accessing data. The mobile device may also be installed with monitoring software to avoid information security risks, such as leakage of confidential information and attack of malware. For reasons of equipment expenses and security issues, only a few top executives of the company may be allowed to use mobile office. However, as mobile devices become popular, more and more people have mobile devices of their own (e.g. laptop computers, tablet computers, and mobile phones), and "Bring Your Own Device (BYOD)" gradually becomes a trend. Such a trend helps companies to save expenses on equipment but raises concern about information security and management issues.

The internal system of a company usually has specific hardware requirements that need to be complied with. Thus, employees of the company that supports mobile office are required to use mobile devices of certain brands or specification, which limits selection of hardware equipment. Furthermore, in order to prevent leakage of business confidential information due to loss of employees' mobile devices, security verification software may be installed in the employees' mobile devices, such that business-related data in the mobile devices can be deleted remotely when the mobile devices are lost or when there is concern of information leakage. However, it would more or less limit the employee's right of using his own mobile device.

Desktop virtualization is one of the methods to achieve BYOD. Desktop virtualization is to create a virtual machine that is like a physical computer with an operating system. The virtualization configuration is usually limited by the capability of simultaneously supporting multiple operating systems on one single physical computer platform. Nevertheless, the mobile office environment built by this method may not be adapted to the habits of the user of the mobile device or may require further adjustment according to the security requirements of the company.

SUMMARY OF THE INVENTION

The invention provides a virtual machine monitoring method and a system thereof for managing and controlling a virtual machine, configuring a visual interface on an electronic device corresponding to the virtual machine, disposing hardware resources of the electronic device corresponding to the virtual machine, and ensuring security of data executed by the virtual machine, so as to be user-friendly and achieve data security.

The invention further provides a virtual machine monitoring method, which achieves data security, facilitates management, and is flexible in use.

The invention provides a virtual machine monitoring method which is adapted for an electronic device. The virtual machine monitoring method includes the following. At least one hardware resource of the electronic device is detected and corresponding hardware configuration data is stored. Display information of the electronic device is detected and corresponding display configuration data is stored. A server is connected and image data is received from the server. A virtual machine is established based on the image data. The at least one hardware resource of the electronic device is configured on the virtual machine based on the hardware configuration data, and a display image is set on the virtual machine based on the display configuration data. When the virtual machine is ended, the image data is cleared.

In an embodiment of the invention, the image data is disposed in a volatile memory block of the electronic device, and when the virtual machine is ended, current image data is generated based on a condition of the virtual machine, the current image data is transmitted to the server, and the volatile memory block of the electronic device is cleared.

In an embodiment of the invention, the display configuration data includes layout, style, location, size, hierarchy, font, color palette, theme, and resolution.

In an embodiment of the invention, at least one hardware resource configured on the virtual machine includes a display which includes a resolution setting value, wherein the resolution setting value is less than or equal to a resolution setting value of a display of the electronic device.

In an embodiment of the invention, the virtual machine monitoring method further includes the following. The display configuration data is set according to the resolution setting value and a type of the electronic device.

In an embodiment of the invention, the virtual machine monitoring method further includes the following. Updated image data is received from the server to re-establish the virtual machine.

In an embodiment of the invention, the virtual machine monitoring method further includes the following. Snapshot data is generated based on the condition of the virtual machine and transmitted to the server.

In an embodiment of the invention, the virtual machine monitoring method further includes the following. Updated snapshot data is received from the server to update the virtual machine.

From another aspect, the invention provides a virtual machine monitoring system adapted for an electronic device. The virtual machine monitoring system includes a main control module, a network service module, a hardware service module, and a display service module. The network service module, the hardware service module, and the display service module are coupled to the main control module. The hardware service module detects at least one hardware resource of the electronic device and stores corresponding hardware configuration data. The display service module detects display information of the electronic device and stores corresponding display configuration data. Moreover, the network service module is connected to a server via an Internet and receives image data from the server. In addition, the main control module establishes a virtual machine based on the image data. The hardware service module configures at least one hardware resource of the electronic device on the virtual machine based on the hardware configuration data. The display service module sets a display image on the virtual machine based on the display configuration data. When the virtual machine is ended, the main control module clears the image data.

Other details of the embodiment of the virtual machine monitoring system are specified as above and thus are not repeated hereinafter.

The invention further provides a virtual machine monitoring method adapted for a server. The virtual machine monitoring method includes the following. A connection request is received from a virtual machine monitoring system. Whether the virtual machine monitoring system conforms to a security policy is determined according to the connection request. If the virtual machine monitoring system conforms to the security policy, image data corresponding to the virtual machine monitoring system is obtained and transmitted to the virtual machine monitoring system in response to the connection request. If the virtual machine monitoring system does not conform to the security policy, the connection request is rejected.

Based on the above, the virtual machine monitoring method and system of the invention allow the user's electronic device to construct a mobile office environment using the virtual machine. Because the virtual machine is established in the volatile memory block of the electronic device, no important business-related data is stored in the electronic device. Important business-related data is stored in the server via the Internet, instead of the electronic device. Therefore, storing confidential data in the electronic device is avoided to effectively protect the confidential data. Moreover, the virtual machine monitoring system of the invention adjusts the user interface to be suitable for the electronic device according to visual conditions of the electronic device, such as different resolutions and screen sizes. Furthermore, the operation interface is adapted to the operation environment of the electronic device, such that the user can operate the system by the interface the user is familiar with and the interface can be user-friendly.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
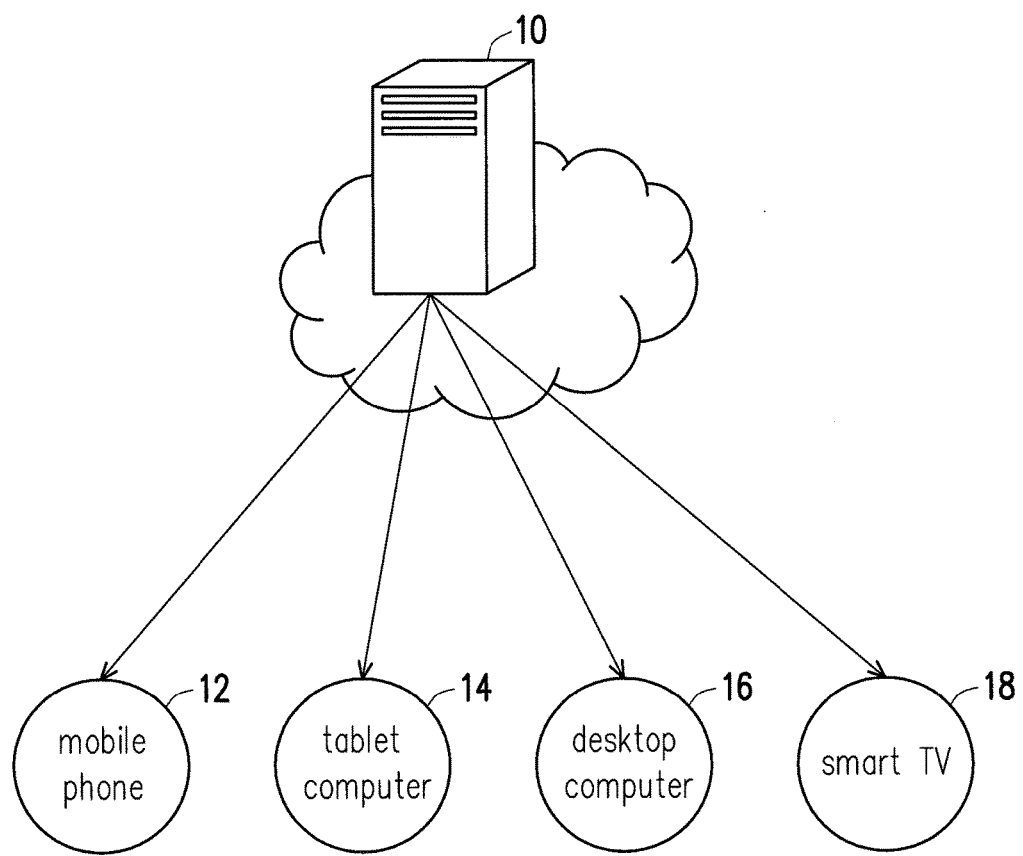
FIG. 1 is a schematic diagram illustrating an operating environment of a virtual machine monitoring method according to an embodiment of the invention.

Descriptions of the disclosure are given with reference to the exemplary embodiments illustrated by the accompanying drawings. Moreover, elements/components/notations with identical reference numerals represent identical or similar parts in the drawings and embodiments.

In an embodiment of the invention, with use of desktop virtualization and virtual desktop infrastructure, each virtual machine can be deemed as a mobile office environment. An electronic device of the user executes the virtual machine by image data to construct the mobile office environment. The virtual machine is established in a volatile memory block of the electronic device. Thus, important business data is not stored in the electronic device. In a business perspective, by the virtual machine monitoring method disclosed by the embodiment of the invention, the data manager can manage the virtual machines collectively through a cloud server on the Internet. In addition, the user, i.e. the employee, can use the virtual machine monitoring system configured in the user's own electronic device and the virtual machine monitoring method described in the embodiments of the invention to operate and manage the virtual machine, so as to present the mobile office environment of the business without worrying about leakage of business data. The virtual machine monitoring system and method are described in detail below with reference to the embodiments.

FIG. 1 is a schematic diagram illustrating an operating environment of a virtual machine monitoring method according to an embodiment of the invention. With reference to FIG. 1, the operating environment of the virtual machine monitoring method includes a server 10 and a plurality of user electronic devices. The user electronic devices may include a mobile phone 12, a tablet computer 14, a desktop computer 16, and a smart TV 18, for example. The server 10 is connected with the user electronic devices via the Internet. It should be noted that a virtual machine monitoring system is configured in the user electronic device; and the virtual machine monitoring system may also be configured in the server 10. Nevertheless, the invention is not limited thereto.

Figure 2A:
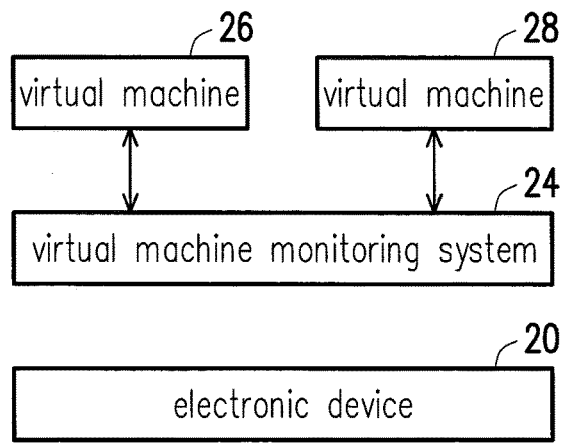
FIG. 2A to FIG. 2B are schematic diagrams illustrating an operation of a virtual machine monitoring system according to an embodiment of the invention.
Figure 2B:
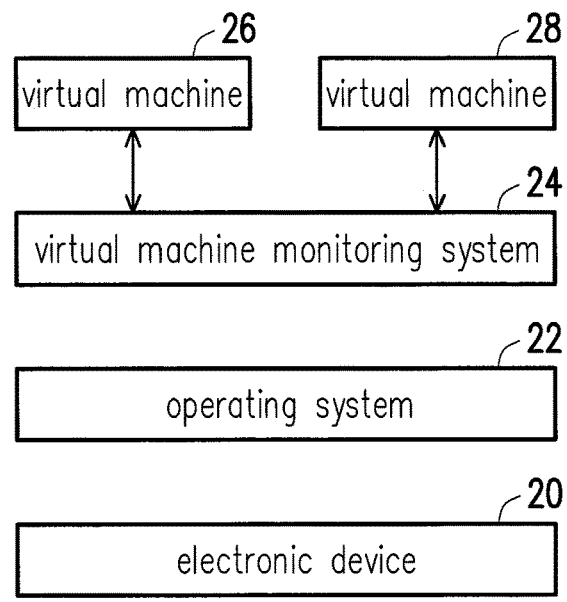

FIG. 2A to FIG. 2B are schematic diagrams illustrating an operation of the virtual machine monitoring system according to an embodiment of the invention. With reference to FIG. 2A, a virtual machine monitoring system 24 is configured in an electronic device 20 for managing virtual machines 26 and 28. Specifically, the virtual machine monitoring system 24 is configured in a hardware element of the electronic device 20 in a firmware form. However, it should be noted that the invention is not limited thereto. With reference to FIG. 2B, the virtual machine monitoring system 24 is configured in an operating system 22 installed in the electronic device 20 for managing the virtual machines 26 and 28. Specifically, the virtual machine monitoring system 24 is configured between the hardware element and the operating system 22 of the electronic device 20. However, it should be noted that the invention is not limited thereto.

More specifically, the operating system 22 is Microsoft Windows, Apple iOS, or Android, for example. Nevertheless, the invention should not be construed as limited thereto. In other words, the virtual machine monitoring system 24 of the invention may be configured in a variety of devices or operating systems and is not restricted by the type of the operating system or the electronic device.

Figure 3:
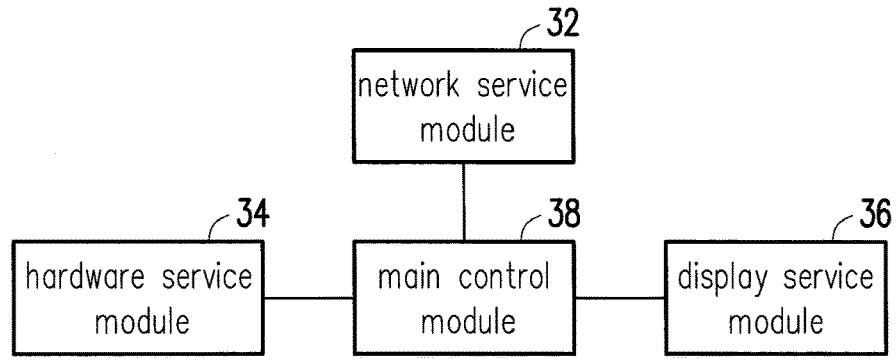
FIG. 3 is a block diagram illustrating a virtual machine monitoring system according to an embodiment of the invention.

FIG. 3 is a block diagram illustrating the virtual machine monitoring system according to an embodiment of the invention. With reference to FIG. 3, a virtual machine monitoring system 30 includes: a network service module 32, a hardware service module 34, a display service module 36, and a main control module 38. The network service module 32 is coupled to the main control module 38 and connected to a server set by a business via the Internet. The network service module 32 complies with an Internet protocol. The hardware service module 34 is coupled to the main control module 38 for detecting hardware resources of the user electronic device (e.g. processor, memory, graphics card, external hard drive, network card, and sound card) and storing configuration and setting of the detected hardware resources as hardware configuration data corresponding to the user electronic device.

The display service module 36 is coupled to the main control module 38. The display service module 36 is configured to detect display information of the user electronic device (e.g. screen resolution, brightness ratio, and desktop theme); and the display service module 36 stores a setting value of the display information as display configuration data corresponding to the user electronic device. Specifically, the display configuration data includes layout, style, location, size, hierarchy, font, color palette, theme, and resolution. Nevertheless, it should be noted that the invention is not limited thereto.

Figure 4:
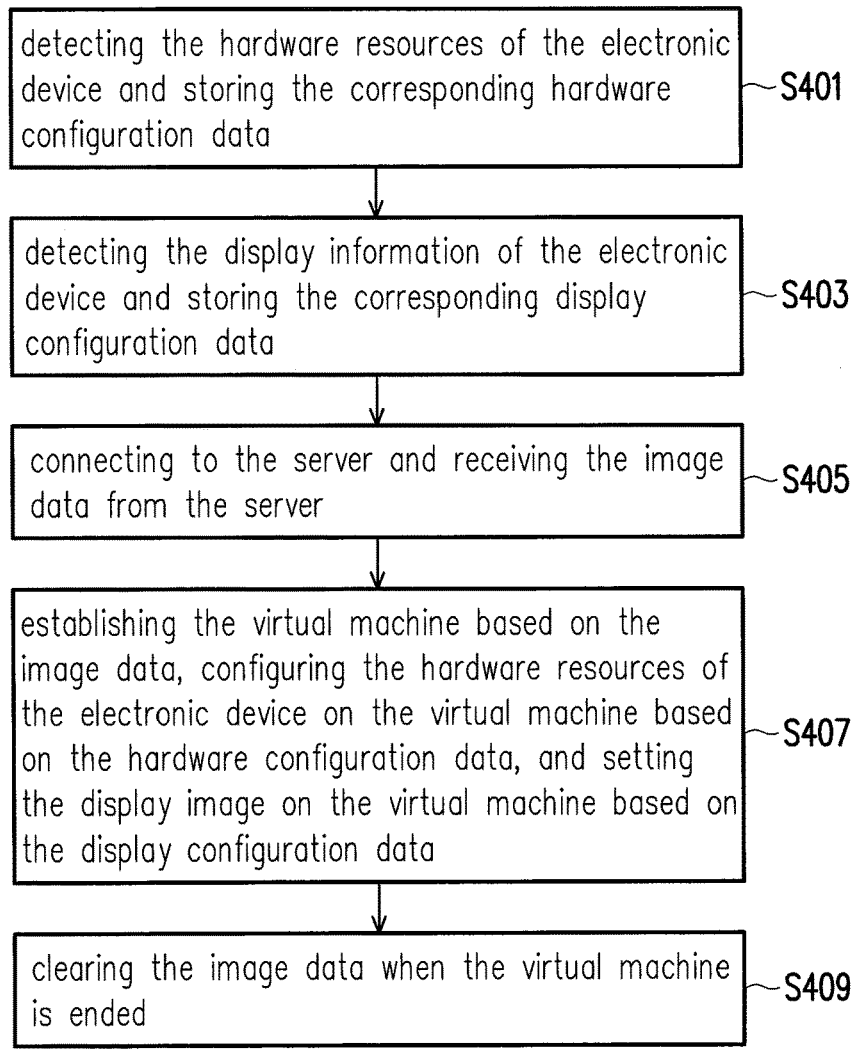
FIG. 4 is a flowchart illustrating a virtual machine monitoring method according to an embodiment of the invention.

FIG. 4 is a flowchart illustrating a virtual machine monitoring method according to an embodiment of the invention. With reference to FIG. 3 and FIG. 4, in Step S401, the hardware service module 34 detects the hardware resources of the electronic device and stores the corresponding hardware configuration data; in Step S403, the display service module 36 detects the display information of the electronic device and stores the corresponding display configuration data; in Step S405, the network service module 32 connects the server via the Internet and receives the image data from the server; in Step S407, the main control module 38 establishes a virtual machine based on image data, the hardware service module 34 configures the hardware resources of the electronic device on the virtual machine based on the hardware configuration data, and the display service module 36 sets a display image on the virtual machine based on the display configuration data; and in Step S409, the main control module 38 clears the image data to end the virtual machine.

Specifically, the above shows the process of presenting the mobile office environment by means of the virtual machine, including establishment and ending of the virtual machine. It is worth mentioning that the image data stores the operating environment of the virtual machine, and the image data is only retained in a cloud server set up by the business and is not retained in the electronic device of the user. More specifically, an image file, which the virtual machine monitoring system receives from the server, is set in the volatile memory block of the electronic device. When the virtual machine is ended, the current operating environment of the virtual machine is stored as current image data to be sent to the server by the virtual machine monitoring system as an updated version, and the volatile memory block of the electronic device is cleared, such that business data is stored only in the cloud terminal, not in the user's device, for data security.

In addition, the virtual machine monitoring system 30 manages at least one virtual machine. In order that the virtual machine monitoring system 30 can easily configure the hardware resources of the corresponding user electronic device, the process of configuring hardware resources on all virtual machines is performed using the hardware configuration data.

Specifically, the hardware configuration data is stored corresponding to the electronic device. For example, for the virtual machine of Employee 1, hardware configuration data corresponding to a mobile phone and hardware configuration data corresponding to a tablet computer are respectively stored; and for the virtual machine of Employee 2, only hardware configuration data corresponding to a mobile phone is stored. When Employee 1 activates the virtual machine belonging to Employee 1 in the tablet computer, the hardware service module 34 configures the hardware resources corresponding to the tablet computer based on the hardware configuration data corresponding to the tablet computer.

Moreover, in order that the user can feel like working in the same office environment and use consistent interfaces on different devices, the virtual machine monitoring system adjusts the interface presented by the virtual machine according to the screen size or other display limitations of the device.

The display service module 36 obtains a screen resolution of the current electronic device, and a screen resolution set to the virtual machine is less than or equal to the screen resolution of the electronic device.

Figure 5:
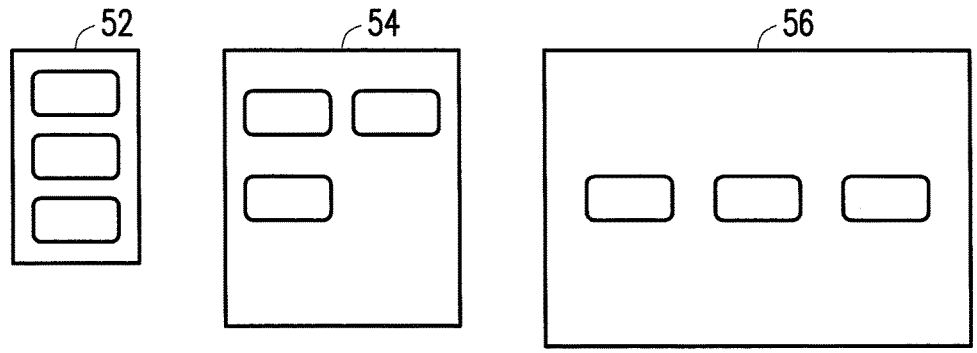
FIG. 5 is a schematic diagram illustrating an adaptive display image according to an embodiment of the invention.

FIG. 5 is a schematic diagram illustrating an adaptive display image according to an embodiment of the invention. With reference to FIG. 5, the layouts on a mobile phone 52, a tablet computer 54, and a desktop computer 56 are adjusted according to the sizes of the screens. More specifically, mobile devices are the priority for the adaptive display image. For example, smart phones have the highest priority, tablet computers have the second high priority, desktop computers have the third high priority, and then smart TVs. However, it should be noted that the embodiments of the invention are not limited to the aforementioned order of priority.

Furthermore, the display service module 36 adjusts the interface to be suitable for the operating system of the electronic device. For example, for Microsoft Windows, the button for closing a window is on the upper right side of the window while the OK button and the Cancel button are on the left side and the right side respectively; and for Apple Macintosh System, the button for closing the window is on the upper left side of the window while the OK button and the Cancel button are on the right side and the left side respectively. Therefore, the user is not required to spend time and efforts on learning how to operate the interface.

It should be noted that the user interface is implemented by User Interface Markup Language (UIML), XML User Interface Language (XUL), eXtensible Cascading Style Sheets (XCSS), or eXtensible Media Queries (XMQ). Nevertheless, the invention is not limited to the foregoing. To be adapted for different devices and different operating systems, the desktop template, color, color palette, font, border attribute, size and position of main elements in the layout, skin, or theme may be dynamically adjusted according to the screen resolution. However, it should be noted that the invention is not limited thereto.

Figure 6:
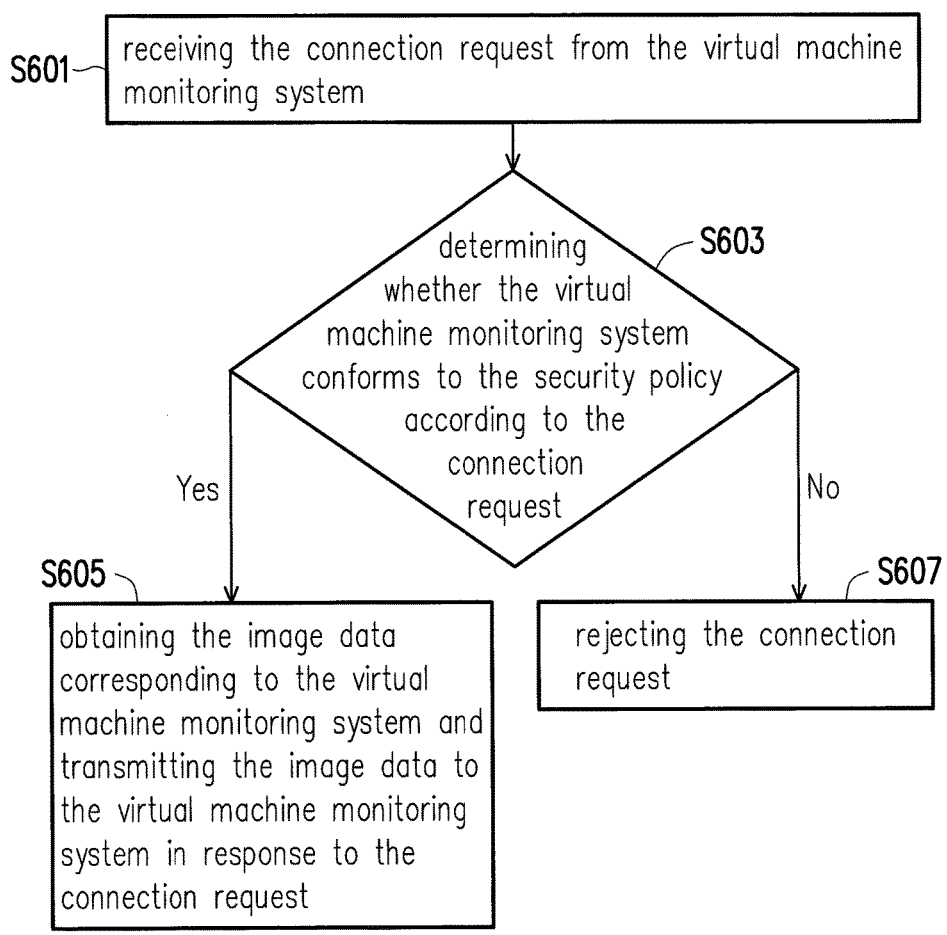
FIG. 6 is a flowchart illustrating a virtual machine monitoring method for a server according to an embodiment of the invention.

FIG. 6 is a flowchart illustrating a virtual machine monitoring method for a server according to an embodiment of the invention. With reference to FIG. 6, in Step S601, the server receives a connection request from a virtual machine monitoring system. In Step S603, the server determines whether the virtual machine monitoring system conforms to a security policy according to the connection request. If the virtual machine monitoring system conforms to the security policy, Step S605 is executed, by which the server obtains image data corresponding to the virtual machine monitoring system and transmits the image data to the virtual machine monitoring system in response to the connection request. If the virtual machine monitoring system does not conform to the security policy, Step S607 is executed, by which the server rejects the connection request of the virtual machine monitoring system.

More specifically, different security policies may be adopted to protect business data. For example, if the server determines that the virtual machine monitoring system is located in the geographical scope of the opponent business, the connection request of the virtual machine monitoring system is rejected so as to prevent the opponent business from stealing commercial secrets. In addition, the security policy may be a timeout determination. For example, if the virtual machine monitoring system detects that the user has not operated the virtual machine for a period of time, a timeout message is sent through the connection request for the server to force the virtual machine to end.

It should be noted that the virtual machine monitoring system detects a condition of the current virtual machine that has been established. When the virtual machine is in a shutdown time, the virtual machine monitoring system transfers a virtual image file with a physical image file from the server to the virtual machine to control the virtual machine. However, the image file cannot be amended, locked, or unlocked, and the change will take effect at the next booting.

Moreover, the virtual machine monitoring system receives updated image data of the virtual machine from the server and completes an update operation when the virtual machine reboots. More specifically, if the user simultaneously uses multiple electronic devices to establish the same virtual machine, the server receives current image data when one of the virtual machines ends, and the server transmits the current image data received as updated image data to the electronic devices corresponding to the virtual machine. The virtual machine on the electronic devices receives the updated image data and is updated after rebooting.

When the virtual machine is in a runtime, the virtual machine monitoring system configures or controls the virtual machine by converting a command to physical memory dump by virtual memory dump. In this state, the virtual machine can be locked, amended, or unlocked, and the virtual machine is operable even in a dormant time. When the virtual machine resumes, the corresponding change takes effect immediately.

In addition, if the virtual machine retained in the cloud server is updated, the virtual machine monitoring system operating in the cloud server first searches for other virtual machine monitoring systems connected thereto and inquires whether the same virtual machine has been established in the other virtual machine monitoring systems, and then transmits an authorized and trusted update supplement to the other virtual machine monitoring systems for carrying out the update procedure.

More specifically, the virtual machine monitoring system generates snapshot data for the virtual machine that is in the runtime and transmits the snapshot data to the server. The server receives the snapshot data corresponding to the virtual machine and transmits the snapshot data to the virtual machine monitoring system that is currently using the virtual machine. The virtual machine monitoring system can lock the current virtual machine for update of the snapshot data. Therefore, the virtual machine is updated instantly. Even if the virtual machine is in the dormant time, the virtual machine can be updated when resuming from the dormant time. It is worth mentioning that the virtual machine monitoring system of the invention allows a condition where a small part of the update is incomplete. For example, the virtual machine is processing audio/video playback. Clips of the audio/video are transmitted to the virtual machine by means of snapshot data. The virtual machine is supposed to continuously receive the snapshot data until the snapshot data converges, i.e. until the playback of the audio/video is completed in this example. Since the virtual machine monitoring system allows the condition where a small part of the update is incomplete, the audio/video playback may stop a few seconds before the end, or rewind play may occur.

To sum up, the virtual machine monitoring method and system of the invention are provided for storing important business data to the cloud server, instead of the user electronic device, through the network, so as to protect confidential business data. Moreover, the virtual machine monitoring system of the invention adjusts the user interface to be suitable for the electronic device according to visual conditions of the electronic device, e.g. different resolutions and screen sizes, and adapts the operation interface to the operation environment of the electronic device, such that the user can operate the system through the interface the user is familiar with and the interface can be user-friendly.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A virtual machine monitoring method adapted for a virtual machine monitoring system of an electronic device, wherein the virtual machine monitoring system is not a virtual machine, the virtual machine monitoring method comprising:

detecting at least one hardware resource of the electronic device and storing corresponding hardware configuration data;

detecting display information of the electronic device and storing corresponding display configuration data;

connecting to a server and receiving image data from the server;

establishing the virtual machine in the electronic device based on the image data, configuring the at least one hardware resource of the electronic device on the virtual machine based on the hardware configuration data, and setting a display image on the virtual machine based on the display configuration data;

receiving updated snapshot data generated by another electronic device from the server to update the virtual machine established in the electronic device when the another electronic device establishes the same virtual machine simultaneously in the another electronic device based on the image data and the another electronic device ends the virtual machine established in the another electronic device; and clearing the image data when the virtual machine is ended, wherein the image data is disposed in a volatile memory block of the electronic device, and when the virtual machine is ended, current image data is generated based on a condition of the virtual machine, the current image data is transmitted to the server, and the volatile memory block of the electronic device is cleared.

2. The virtual machine monitoring method according to claim 1, wherein the display configuration data comprises layout, style, location, size, hierarchy, font, color palette, theme, and resolution.

3. The virtual machine monitoring method according to claim 1, wherein at least one hardware element configured on the virtual machine comprises a display which comprises a resolution setting value, wherein the resolution setting value is less than or equal to a resolution setting value of a display of the electronic device.

4. The virtual machine monitoring method according to claim 3, further comprising:
setting the display configuration data according to the resolution setting value and a type of the electronic device.

5. The virtual machine monitoring method according to claim 1, further comprising:
receiving updated image data from the server to re-establish the virtual machine.

6. The virtual machine monitoring method according to claim 1, further comprising:
generating snapshot data based on a condition of the virtual machine and transmitting the snapshot data to the server.

7. A virtual machine monitoring system adapted for an electronic device, wherein the virtual machine monitoring system is not a virtual machine, the virtual machine monitoring system comprising:
a main control module;
a network service module coupled to the main control module;
a hardware service module coupled to the main control module and configured to detect at least one hardware resource of the electronic device and store corresponding hardware configuration data; and
a display service module coupled to the main control module and configured to detect display information of the electronic device and store corresponding display configuration data,
wherein the network service module is connected to a server via an Internet and receives image data from the server,
the main control module establishes the virtual machine in the electronic device based on the image data, the hardware service module configures the at least one hardware resource of the electronic device on the virtual machine based on the hardware configuration data, and the display service module sets a display image on the virtual machine based on the display configuration data,
the main control module receives updated snapshot data generated by another electronic device from the server to update the virtual machine established in the electronic device when the another electronic device establishes the same virtual machine simultaneously in the another electronic device based on the image data and the another electronic device ends the virtual machine established in the another electronic device, and
the main control module clears the image data when the virtual machine is ended,
wherein the image data is disposed in a volatile memory block of the electronic device, and when the virtual machine is ended, the main control module generates current image data based on a condition of the virtual machine, the current image data is transmitted to the server through the network service module, and the main control module clears the volatile memory block of the electronic device.

8. The virtual machine monitoring system according to claim 7, wherein the display configuration data comprises layout, style, location, size, hierarchy, font, color palette, theme, and resolution.

9. The virtual machine monitoring system according to claim 7, wherein at least one hardware element that the hardware service module configures on the virtual machine comprises a display which comprises a resolution setting value, wherein the resolution setting value is less than or equal to a resolution setting value of a display of the electronic device.

10. The virtual machine monitoring system according to claim 9, wherein the display service module sets the display configuration data according to the resolution setting value and a type of the electronic device.

11. The virtual machine monitoring system according to claim 7, wherein the main control module receives updated image data from the server through the network service module to re-establish the virtual machine.

12. The virtual machine monitoring system according to claim 7, wherein the main control module generates snapshot data based on a condition of the virtual machine and transmits the snapshot data to the server through the network service module.

* * * * *